(12) United States Patent
Patricelli (10) Patent No.: US 12,304,642 B2
(45) Date of Patent: May 20, 2025

(54) VEHICLE AND METHOD OF COOLING A COMPARTMENT OF SAID VEHICLE

(71) Applicant: LEONARDO S.P.A., Rome (IT)

(72) Inventor: Luca Patricelli, Samarate (IT)

(73) Assignee: LEONARDO S.P.A., Rome (IT)

( * ) Notice: Subject to any disclaimer, the term of this patent is extended or adjusted under 35 U.S.C. 154(b) by 689 days.

(21) Appl. No.: 17/295,967

(22) PCT Filed: Oct. 31, 2019

(86) PCT No.: PCT/IB2019/059363
§ 371 (c)(1),
(2) Date: May 21, 2021

(87) PCT Pub. No.: WO2020/109889
PCT Pub. Date: Jun. 4, 2020

(65) Prior Publication Data
US 2022/0009641 A1    Jan. 13, 2022

(30) Foreign Application Priority Data

Nov. 30, 2018 (EP) ..................................... 18209443

(51) Int. Cl.
*B64D 13/08* (2006.01)
*B64D 13/06* (2006.01)

(52) U.S. Cl.
CPC ...... *B64D 13/08* (2013.01); *B64D 2013/0674* (2013.01); *B64D 2013/0688* (2013.01)

(58) Field of Classification Search
CPC ............ B64D 13/08; B64D 2013/0674; B64D 2013/0688
(Continued)

(56) References Cited

U.S. PATENT DOCUMENTS 4,015,438 A * 4/1977 Kinsell .................. F25B 9/004
62/88
4,018,060 A   4/1977 Kinsell et al.
(Continued)

FOREIGN PATENT DOCUMENTS

| CN | 103079956 | 5/2013 |
| CN | 107054664 | 8/2017 |

(Continued)

OTHER PUBLICATIONS

JP First Office Action in JP Application No. 201980078880.5, mailed Nov. 16, 2023 (10 pages) an English Translation attached hereto.

*Primary Examiner* — Allen R. B. Schult
(74) *Attorney, Agent, or Firm* — Leason Ellis LLP (57) ABSTRACT

An aerial, marine or land vehicle comprising: a compartment to be cooled; a first circuit through which can pass and, in turn, comprising, a heat exchanger that can be fed with the coolant and is designed to enable the coolant to release heat; a second circuit that can be fed with a second flow of a heat-carrying fluid and is thermally coupled to the heat exchanger; and supply means for supplying a mixture comprising water, inside the second flow in a position upstream of the heat exchanger and spaced from the heat exchanger, proceeding along the feed direction of the second flow along the second circuit, so as to cause evaporation of the mixture and cool the second flow in the heat exchanger.

11 Claims, 4 Drawing Sheets

(58) Field of Classification Search
USPC .......................................................... 454/76
See application file for complete search history.

(56) References Cited

U.S. PATENT DOCUMENTS

| | | | |
|---|---|---|---|
| 4,895,004 | A | 1/1990 | De'longhi |
| 5,419,147 | A | 5/1995 | Cooper |
| 6,463,751 | B1 | 10/2002 | Teller |
| 10,543,925 | B2 * | 1/2020 | Bammann ................. F25B 9/10 |
| 2001/0004837 | A1 | 6/2001 | Sauterleute |
| 2003/0019237 | A1 | 1/2003 | Clarke et al. |
| 2004/0040326 | A1 | 3/2004 | Hunt |
| 2006/0162371 | A1 | 7/2006 | Lui et al. |
| 2008/0022709 | A1 * | 1/2008 | McKee ................. F24F 5/0035 700/275 |
| 2010/0084030 | A1 * | 4/2010 | Mackulin ............... B64D 11/02 137/590.5 |
| 2013/0061615 | A1 * | 3/2013 | Omer .................... F24F 13/222 62/277 |
| 2013/0160472 | A1 | 6/2013 | Klimpel et al. |
| 2017/0152050 | A1 | 6/2017 | Klimpel |
| 2017/0205094 | A1 * | 7/2017 | McDonnell ........ H05K 7/20827 |
| 2017/0233083 | A1 | 8/2017 | Behrens et al. |
| 2018/0057174 | A1 | 3/2018 | Klimpel et al. |

FOREIGN PATENT DOCUMENTS

| | | |
|---|---|---|
| EP | 1 279 594 | 1/2003 |
| JP | 2001213398 | 8/2001 |
| WO | WO 2012/022758 | 2/2012 |
| WO | WO 2016/170141 | 10/2016 |

* cited by examiner

VEHICLE AND METHOD OF COOLING A COMPARTMENT OF SAID VEHICLE

CROSS-REFERENCE TO RELATED APPLICATIONS

This patent application is a U.S. National Phase Application under 35 U.S.C. § 371 of International Patent Application No. PCT/IB2019/059363, filed on Oct. 31, 2019, which claims priority from European patent application no. 18209443.3 filed on Nov. 30, 2018, all of which are incorporated by reference, as if expressly set forth in their respective entireties herein.

TECHNICAL FIELD

The present invention relates to a vehicle and a method of cooling a compartment of said vehicle.

In this description, the term vehicle means an aerial, naval or railway vehicle, and, more generally, any moving object with a compartment inside which it is necessary to maintain a certain temperature range, with respect to variable external temperature levels or heat generated due to operation of the compartment.

In this description, the term compartment means an environment to be cooled that contains air, such as a cabin or a passenger compartment, or a functional unit, such as, for example, a gear train.

More specifically, the present invention relates to an aerial vehicle and to an associated cooling method.

The aerial vehicle is, in particular, an aeroplane, a convertiplane or a gyrodyne.

BACKGROUND ART

Aircrafts comprise, in a known manner, an air conditioning system, which is adapted to extract or introduce heat in the passenger compartment or cabin so as to maintain a desired temperature level inside the passenger compartment or cabin, with respect to environmental temperatures outside the aircraft variable, for example, between −30° C. and 50° C.

This extraction or introduction of heat takes place through feeding "cold" air or "hot" air, respectively, inside the cabin or passenger compartment at respective temperatures lower or higher than that existing in the cabin or passenger compartment.

Essentially, according to a known solution, the air conditioning system draws air from the outside and compresses it, thereby increasing the temperature and producing hot air to be sent to the cabin. The hot air to be sent to the cabin is, for example, bled from the compressor stages normally present in the aircraft's power units.

In a known manner, the air conditioning system also produces cold air to be sent to the cabin or passenger compartment through a cycle known as the "air" cycle, as it is the same air that undergoes the thermodynamic transformations necessary to bring it to the desired conditions of low temperature and correct pressure. From the thermodynamic standpoint, this "air" cycle is the equivalent of a reverse Joule cycle.

U.S. Pat. Nos. 4,018,060, 4,493,195 and US 2001/004837 describe the use of an "air" cycle for cooling the cabin air of an aircraft.

Alternatively, the air conditioning system produces "cold" air to be sent to the cabin through a vapour compression refrigeration cycle, also known as a "vapour cycle", in which a coolant other than air undergoes the thermodynamic transformations. In particular, the coolant, for example R134a, undergoes a liquid-vapour phase change during the vapour compression cycle and must, therefore, be able to evaporate at low temperatures of around a few tens of degrees below 0° C. and at pressures higher than atmospheric pressure, and to condense at temperatures of around 50-115° C. at pressures that are not too high.

In cases where a vapour compression cycle is used, the air conditioning system comprises:
a first closed circuit, through which a coolant passes and along which the vapour compression cycle is performed; and
a second circuit, fluidically connected to the cabin and through which air recirculates from and to the cabin.

In greater detail, the first circuit comprises, in sequence:
a compressor, which compresses the coolant in the vapour phase;
a condenser, which causes the transition of the coolant from the vapour phase to the liquid phase;
a thermal expansion valve, which causes the transition of the coolant to a two-phase condition formed by a vapour-liquid mixture; and
an evaporator, which causes the transition of the coolant from the two-phase condition to a vapour phase.

In particular, the coolant absorbs heat from the outside, inside the evaporator, and releases heat to the outside, inside the condenser.

The second circuit comprises an inlet and an outlet fluidically connected to the cabin and a fan to create air circulation from the inlet to the outlet.

The evaporator is interposed along the second circuit in a position interposed between the inlet and the outlet.

In this way the evaporator removes heat from the hot air coming from the inlet of the second circuit. Consequently, cooled air reaches the outlet of the second circuit and the aircraft's cabin.

The efficiency of the vapour compression cycle, also known as the coefficient of Performance, is higher the more heat is released by the condenser, and lesser the more heat is absorbed by the evaporator.

The heat absorbed by the evaporator is determined by the need to cool the air to be sent to the cabin and therefore constitutes a design constraint.

Therefore, the efficiency of the vapour compression cycle is generally raised by increasing the exchange surface and, consequently, the size and weight of the condenser.

However, these weight increases make these improvement techniques not very adapted for moving vehicles and even less suitable for aerial vehicles, for which any increase in weight results in a reduction in payload.

There is awareness in the industry of the need to raise the efficiency of the vapour compression cycle without increasing the overall surface of the condenser, so as not to increase the bulk and weight of the air conditioning system.

It is important to note that the certification requirements of convertiplanes require that predetermined temperature levels are maintained in the cabin with respect to variable external temperatures ranging between −55° C. and +55° C. outside the convertiplane.

There is awareness in the industry of the need to ensure these predetermined temperature levels are maintained by optimizing the weight, bulk and consumption of the cooling system.

There is also awareness in the industry of the need to optimize the functioning of the aircraft's cooling system according to the temperature outside the aircraft, which is highly variable with latitude and the operating altitude of the aircraft.

U.S. Pat. No. 4,895,004 describes an air conditioning system for residential applications and using a vapour compression cycle.

In particular, U.S. Pat. No. 4,895,004 describes the use of a first finned condenser for air-cooling the coolant and a second tubular condenser for water-cooling the coolant.

U.S. Pat. No. 5,419,147 describes an air conditioning system for residential applications and using a vapour compression cycle. In particular, teaches reducing the temperature of condensation in the condenser by applying an amount of water directly on the condenser so as to saturate and cool the air lapping the condenser.

U.S. Pat. No. 6,463,751 describes an air conditioning system for residential applications and using a vapour compression cycle. In particular, U.S. Pat. No. 6,463,751 teaches improving the efficiency of the air conditioning system by condensing the condensate water produced by the evaporator directly on the condenser. In particular, the condensate water is supplied to the condenser via an upper panel that covers the condenser and is provided with a passage for the air and a plurality of drainage holes to allow the condensate water produced by the evaporator to drip down. This solution does not guarantee continuity in the feeding of condensate water from the evaporator to the condenser, as the amount of available condensate water is limited.

The solutions shown in U.S. Pat. Nos. 5,419,147 and 6,463,751 are based on the supply of water directly on the condenser. This limits temperature reduction of the outer surface of the condenser and, consequently, the efficiency increase of the air conditioning system.

Convertiplanes, and more generally moving vehicles, further comprise functional units, for example gear trains that generate heat during operation and need to be cooled.

According to a known solution, these functional units are cooled by means of a fluid-based cooling system, in particular an oil-based cooling system.

This preferably happens if it is inappropriate to create air circulation through the compartment.

This cooling system basically comprises:
a heat exchanger adapted to cool the hot fluid;
a first fluid supply line, which extends between the compartment and the heat exchanger and is adapted to convey the hot fluid from the compartment to the heat exchanger; and
a second fluid return line, which extends between the heat exchanger and the compartment and is adapted to convey the cooled fluid from the heat exchanger to the compartment.

In the case of a fluid-based cooling system, there is also awareness in the industry of the need to increase, in the simplest manner possible, the amount of heat transferred in heat exchanger, in order to increase as far as possible the amount of heat removed from the lubricating fluid inside the heat exchanger and, therefore, the temperature of the fluid in the return line and the capacity of the fluid to remove heat from the compartment.

Finally, there is awareness in the industry of the need to further increase the efficiency of the cooling systems described in the aforementioned known solutions, while interfering with the aircraft as little as possible, i.e. by means of a solution that can be easily retrofitted to the aircraft.

WO-A-2012/022758 discloses an air-conditioning system for an aircraft. The air-conditioning system comprises a compressed air branch for conveying externally supplied and pressurized air, preferably bleed air. Furthermore, a cooling circuit for conveying preferably liquid refrigerant is provided and extends through a ram air duct. The system also comprises a first heat exchanger for the heat transfer between the compressed air branch and the cooling circuit, a compressed air turbine that is arranged in the compressed air branch and a cooling circuit compressor that is arranged in the cooling circuit and mechanically coupled to the compressed air turbine.

US-A-2017/152050 discloses an aircraft air conditioning system with an ambient air supply line adapted to be flown through with ambient air, an ambient air cooling apparatus, which is connected to the ambient air supply line and is configured to cool the ambient air flowing through the ambient air supply line, an ambient air discharge line, which is connected to the ambient air cooling apparatus and is connectable to an aircraft cabin, in order to conduct ambient air cooled by the ambient air cooling apparatus into the aircraft cabin, a process air supply line adapted to be flown through with compressed process air, a process air cooling apparatus, which is connected to the process air supply line and is configured to cool the compressed process air flowing through the process air supply line, a process air discharge line, which is connected to the process air cooling apparatus and is connectable to the aircraft cabin, in order to conduct process air cooled by the process air cooling apparatus into the aircraft cabin, and a refrigerating apparatus, which comprises a refrigerant circuit adapted to be flown through with a refrigerant and being thermally coupled to the ambient air cooling apparatus and to the process air cooling apparatus, in order to transfer thermal energy from the ambient air cooling apparatus and the process air cooling apparatus to the refrigerant circulating in the refrigerant circuit. A bypass line branching off from the process air discharge line is configured to discharge the cooled process air flowing through the process air discharge line into an aircraft environment at least in certain operating phases of the aircraft air conditioning system.

EP-A-1279594 discloses an air cycle cooling system for cooling a first heat load and a second heat load, includes a compressor to pressurise air in the system, and an expansion apparatus for allowing the compressed air to expand and cool for use in cooling the first and second heat loads, and wherein at least a proportion of the air utilised for cooling the first heat load is recycled to the compressor and at least a proportion of the air utilised for cooling the second heat load is utilised as a coolant in a primary heat exchanger to cool the air from the first heat load prior to the air from the first heat load being expanded in the expansion apparatus.

WO-A-2016/170141 discloses an aircraft air conditioning system with an ambient air line which is adapted to be flown through with ambient air and which is connected to a mixer of the aircraft air conditioning system, in order to feed ambient air into the mixer, at least one ambient air compressor arranged in the ambient air line for compressing the ambient air flowing through the ambient air line, a refrigerating machine, which comprises a refrigerant circuit adapted to be flown through with a refrigerant as well as a refrigerant compressor arranged in the refrigerant circuit, wherein the refrigerant circuit is thermally coupled to the ambient air line in order to transfer heat from the ambient air flowing through the ambient air line to the refrigerant circulating in the refrigerant circuit before the ambient air is fed into the mixer, and at least one electric motor for driving the at least one ambient air compressor and/or the refrigerant compressor.

U.S. Pat. No. 4,015,438 discloses an air cycle air conditioning system for vehicles, wherein the air at substantially ambient pressure is cooled in a heat exchanger and introduced into an enclosure for cooling. The air is withdrawn from the enclosure and a portion of the air is expanded through a turbine for additional cooling and passed through the heat exchanger for the removal of heat therefrom. The air is then compressed to substantially ambient pressure and expelled. Additional cooling of the expanded air from the turbine may be obtained by evaporating a fluid therein.

The fluid may be water condensed in, and withdrawn from, the heat exchanger.

DISCLOSURE OF INVENTION

The object of the present invention is to produce an aerial, land or marine vehicle that satisfies at least one of the aforementioned needs in a simple and inexpensive manner.

The aforesaid object is achieved by the present invention, in so far as it relates to an aerial, land or marine vehicle, according to claim 1.

The present invention also relates to a method of cooling a compartment of an aerial, land or marine vehicle, according to claim 7.

BRIEF DESCRIPTION OF THE DRAWINGS

For a better understanding of the present invention, one preferred embodiment are described hereinafter, by way of non-limitative example and with reference to the accompanying drawings, in which.

BEST MODE FOR CARRYING OUT THE INVENTION

Figure 1:
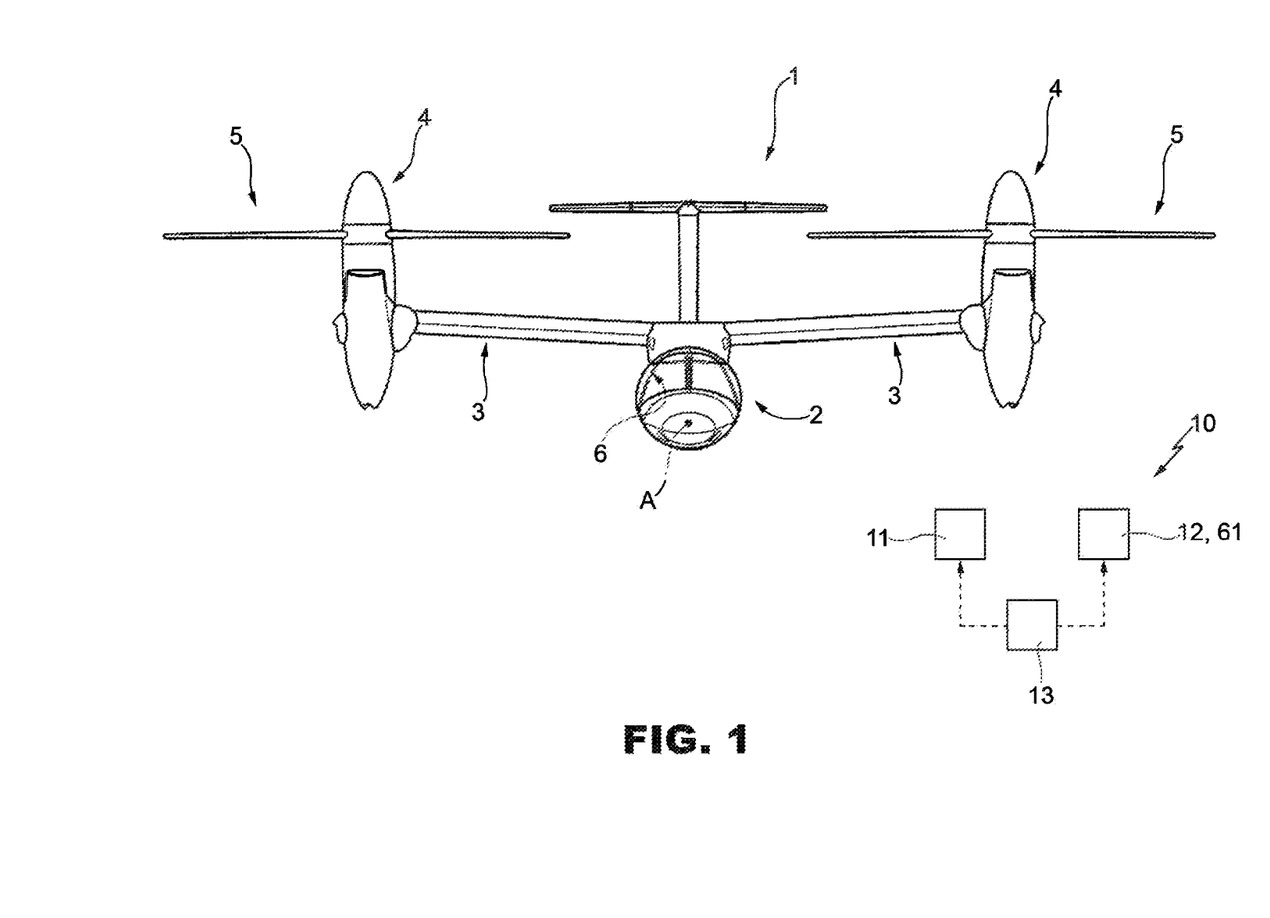
FIG. 1 shows a front view of a vehicle, in particular a convertiplane produced according to a first embodiment of the present invention and comprising a cooling system.

Referring to FIG. 1, reference numeral 1 indicates a vehicle. In this description, the term "vehicle" means any self-propelled vehicle, in particular a land, aerial or marine vehicle.

Preferably, the vehicle 1 is a pressurized aircraft, a convertiplane in the case shown.

The convertiplane 1 basically comprises:
a fuselage 2 with a longitudinal axis of extension A;
a pair of half-wings 3 extending in a cantilever fashion from respective mutually opposite sides of the fuselage 2 and transversally to axis A; and
a pair of nacelles 4 housing associated rotors 5.

The convertiplane 1 further comprises a compartment 6 defining a cabin for a crew and/or a passenger compartment for passengers.

The convertiplane 1 further comprises an air conditioning system 10 (only schematically shown), which is adapted to adjust the temperature inside the compartment 6, i.e. to maintain said temperature within a given range.

More specifically, the system 10 comprises:
a "hot" air supply unit 11, i.e. supplying air at a temperature higher than the temperature inside the compartment 6;
a "cold" air supply unit 12, i.e. supplying air at a temperature lower than the temperature inside the compartment 6; and
a control unit 13 (only schematically shown) programmed to control the units 11 and 12 according to the thermal factors outside the convertiplane 1 and the desired temperature range that it is wished to achieve inside the compartment 6.

In greater detail, unit 11 is shown only as a duct 15 supplying hot air to the compartment 6.

In some embodiments, unit 12 could have some elements shared with or thermally coupled to unit 11.

Without any loss of generality, unit 12 is described hereinafter without reference to any mechanical or thermal coupling to unit 11.

Unit 12 comprises (FIG. 2):
a closed circuit 20 through which a coolant passes; and
an air circulation circuit 50 fluidically connected to the compartment 6.

Figure 2:
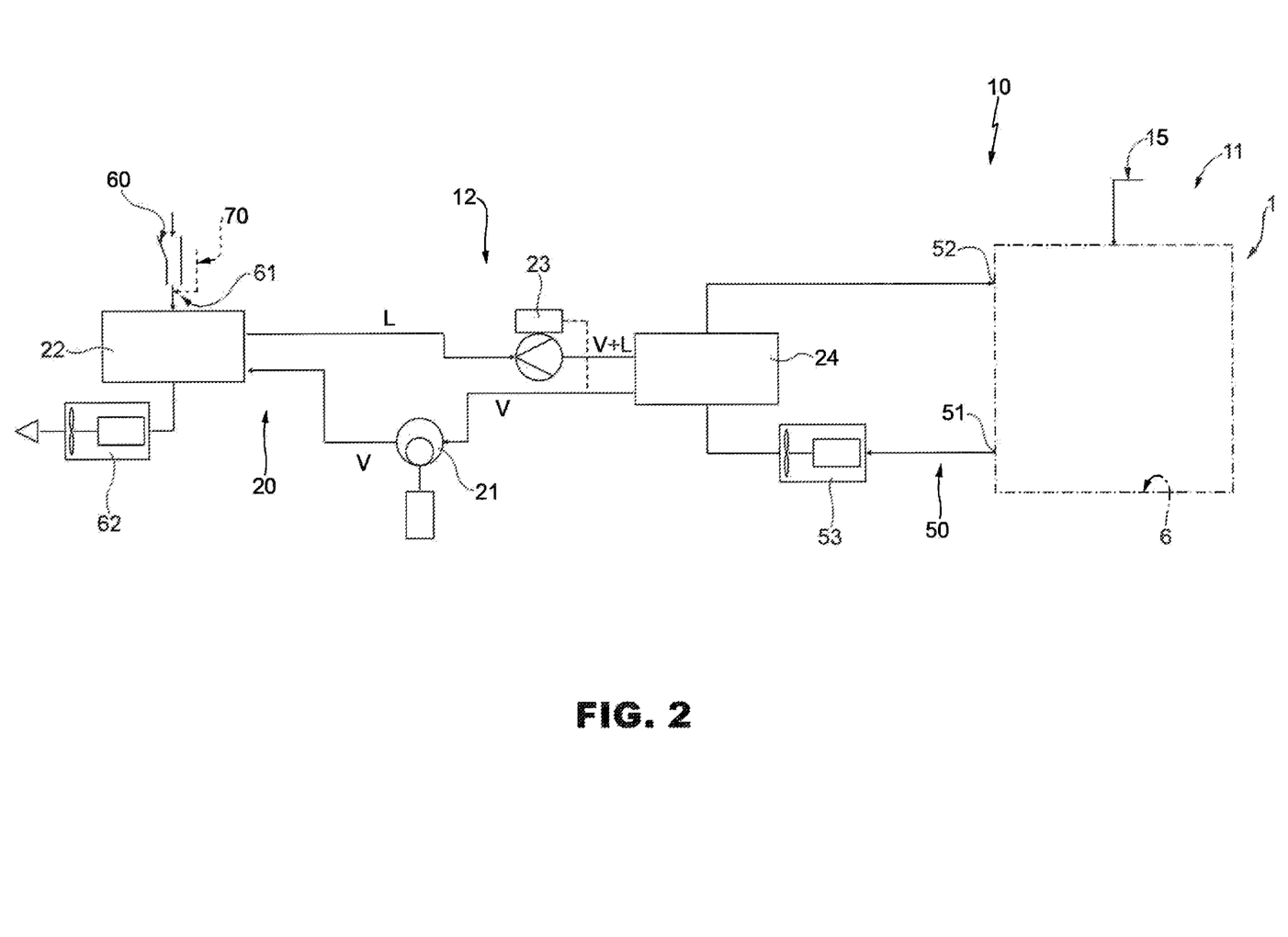
FIG. 2 is a functional diagram of first details of the air conditioning system of FIG. 1, with some parts not shown for the sake of clarity.

In greater detail, the coolant performs a thermodynamic cycle, known as a vapour compression cycle, inside circuit 20.

During this cycle, the coolant undergoes a liquid L to vapour V phase transition and vice versa.

In the case shown, the coolant is one of the fluids commonly known as Freon, for example R134a, R1234YE or R1234YF, or carbon dioxide.

Circuit 20 comprises, in sequence:
a compressor 21, which is driven by an electric motor and compresses the coolant in the vapour phase V;
a condenser 22, which causes transition of the coolant from the vapour phase V to the liquid phase L;
a thermal expansion valve 23, which causes transition of the coolant to a two-phase condition formed by a mixture L+V of liquid L and vapour V; and
an evaporator 24, which causes transition of the coolant from the two-phase condition L+V to the vapour phase V.

In particular, the coolant absorbs heat from the outside, inside the evaporator 24, and releases heat to the outside, inside condenser 22.

Circuit 50, in turn, comprises:
an inlet 51 fluidically connected to the compartment 6;
an outlet 52 fluidically connected to the compartment 6; and
a fan 53 to create air circulation from the inlet 51 to the outlet 52.

Circuit 50 is thermally coupled to the evaporator 24 in a position interposed between the inlet 51 and the outlet 52.

More specifically, the air flowing in circuit 50 releases heat to the evaporator 24.

Therefore, the air flowing in circuit 50 cools down, having a temperature at the outlet 52 lower than the temperature at the inlet 51.

Unit 12 comprises (FIG. 2):
a circuit 60, which can be fed with a flow of air and is thermally coupled to the condenser 22; and
supply means 61 for supplying water inside the second flow in a position upstream of the condenser 22 and spaced from said condenser 22, proceeding along the feed direction of the second flow along circuit 60, so as to cause evaporation of the water and cool the air within the flow flowing in circuit 60 in the condenser 22.

More specifically, the water supplied in circuit 60 evaporates, removing heat from the air flowing in circuit 60 upstream of the condenser 22. The airflow is thus cooled and humidified. The lowering of the temperature of the airflow that laps the condenser 22 lowers the temperature and the condensation pressure of the coolant. This enables increasing the amount of heat absorbed by the condenser 22, and hence the efficiency of the vapour compression cycle.

This efficiency is further increased because the water droplets that remain in the liquid phase in the airflow lap the condenser, thereby increasing the coefficient of heat exchange between the airflow and the condenser 22.

In fact, the high speed of the air induces a continuous regeneration of the fluid film on the surface of the condenser 22, preventing the film from reaching thermal equilibrium with said surface and causing a further increase in the amount of heat absorbed by the condenser 22.

Unit 12 also comprises a fan 62 interposed along circuit 60 and adapted to enable continuous air circulation inside circuit 60.

Figure 3:
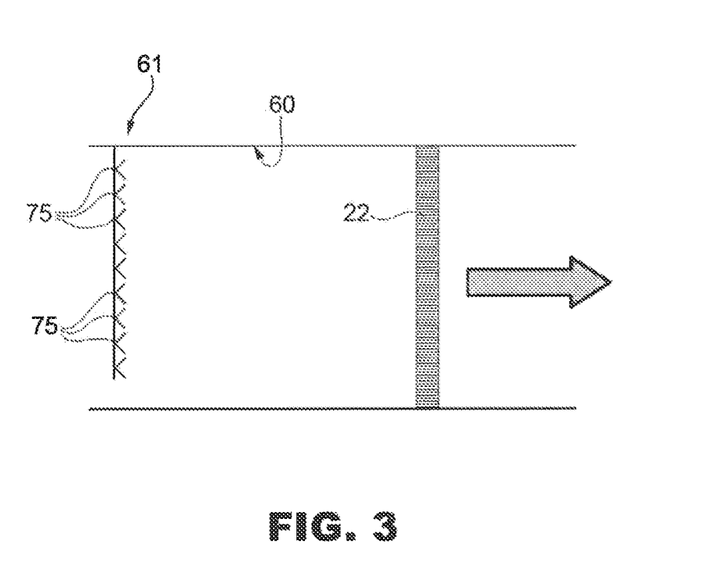
FIG. 3 is a functional diagram of second details of the air conditioning system of FIGS. 1 and 2, with some parts not shown for the sake of clarity.

Referring to FIG. 3, unit 12 further comprises a circuit 70 provided to feed the mixture to the supply means 61.

In greater detail, circuit 70 comprises a tank 71 arranged on board the convertiplane 1 and fluidically connected to the supply means 61.

Circuit 70 is also fluidically connectable to a tank 72 outside the convertiplane 1 and arranged on the ground. Obviously, circuit 70 is fluidically connected to tank 72 only when the convertiplane 1 is on the ground.

Preferably, circuit 70 is fluidically connected to a collection drum 73 (FIG. 5) for the condensate water generated by the evaporator 24.

Figure 5:
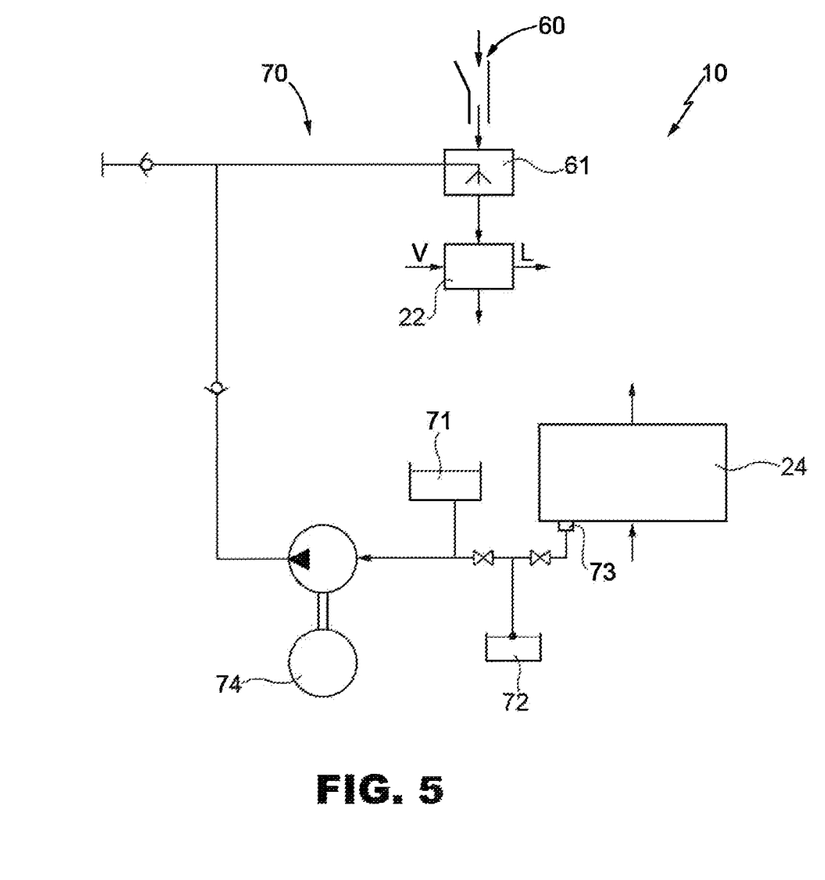

In a preferred embodiment, the amount of water made available by the collection drum 73 for circuit 70 is insufficient to permit a continuous lowering of the temperature of the condenser 22 over time. Therefore, circuit 70 is simultaneously connected to one or both of the tanks 71 and 72 and to the collection drum 73.

Referring to FIG. 3, the supply means 61 comprise a plurality of injectors 75, fed by circuit 70 and facing into circuit 60 upstream of said condenser 22, according to said feed direction, so as to eject jets of water into the airflow flowing in circuit 60.

Alternatively (FIG. 4), the supply means 61 comprise a plurality of sprayers 76, fed by circuit 70 and facing into circuit 60 upstream of said condenser 22, according to said feed direction, so as to eject water spray into the airflow flowing in circuit 60.

Figure 4:
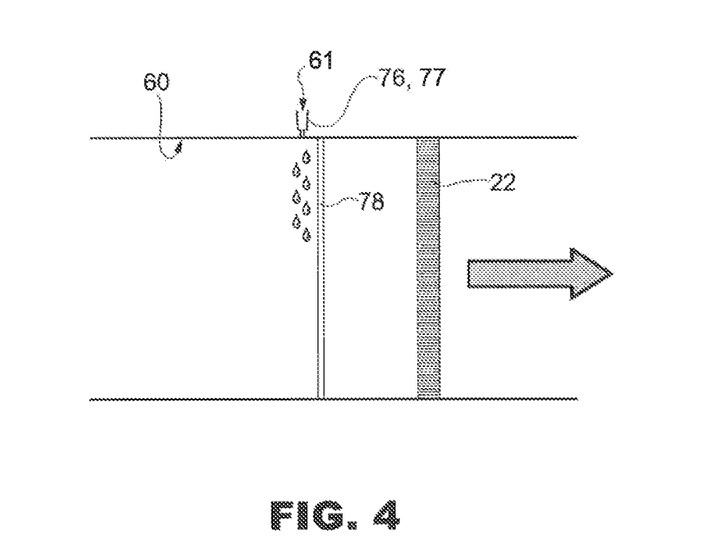
FIGS. 4 and 5 show respective embodiments of some details of the system of FIGS. 2 and 3.

Alternatively, the supply means 61 comprise a plurality of gravity drippers 77, fed by circuit 70 and facing into circuit 60 upstream of said condenser 22, according to the aforementioned feed direction, so as to eject respective sequences of droplets into the airflow flowing in circuit 60.

Circuit 60 further comprises a membrane 78 arranged upstream of the condenser 22 and lapped by the airflow, and on which the sprayers 76 or drippers 77 respectively eject water spray or eject respective sequences of water droplets (FIG. 4).

The membrane 78 is humidified by the water injected into circuit 70, thus ensuring that water can evaporate inside circuit 70 upstream of the condenser 22.

Circuit 70 further comprises a pump 74 adapted to feed water to the supply means 61 (FIG. 5).

The control unit 13 is programmed to selectively:
  activate the supply means 61, when the environmental temperature outside the convertiplane 1 is higher than a given threshold value; or
  deactivate the supply means 61, when the environmental temperature outside the convertiplane 1 is lower than a given threshold value.

The external environmental temperature is normally dependent on the latitude and altitude of the convertiplane 1.

In use, the system 10 adjusts the temperature inside the compartment 6 by supplying "hot" air or "cold" air, according to the environmental conditions outside the convertiplane.

More specifically, the terms "hot" air and "cold" air respectively mean air at a temperature greater than or less than the temperature of the compartment 6.

The functioning of the system 10 is described hereinafter only in relation to the operation of the supply unit 12 providing "cold air" inside the compartment 6.

In greater detail, the fan 53 of circuit 50 creates the continuous circulation of air from the inlet 51 to the outlet 52, passing through the evaporator 24 of circuit 20 and the compartment 6 of the convertiplane.

The coolant follows a vapour compression cycle inside circuit 20, during which it undergoes the following thermodynamic transformations:
  compression in the vapour phase V inside the compressor 21;
  undergoing a transition from the vapour phase V to the liquid phase L inside the condenser 22;
  being thermally expanded, such as to undergo transition to a two-phase condition L+V in which it is a mixture of liquid L and vapour V; and
  evaporation, undergoing a transition from the two-phase condition L+V to the vapour phase V.

In greater detail, the coolant releases heat in the condenser 22 and absorbs heat from the air circulating in circuit 50 in the evaporator 24.

This absorption of heat causes the air circulating in circuit 50 to cool down and the consequent supply of "cold" air at the outlet 52 and to the compartment 6.

Circuit 20 causes air circulation through the condenser 22.

When the outside temperature is higher than a threshold value, for example because the convertiplane 1 is below an altitude threshold or is stationary on the ground in a desert area, the control unit 13 activates the supply means 61.

As a result, the supply means 61 supply water inside the airflow flowing in circuit 60 upstream of the condenser 22 and in a position spaced from the condenser 22.

This causes at least the partial evaporation of the water introduced by the supply means 61, with removal of heat from the airflow flowing in circuit 60 and consequent cooling and humidification of said airflow.

The lowering of the temperature of the airflow that laps the condenser 22 enables increasing the amount of heat absorbed by the condenser 22, and consequently the efficiency of the vapour compression cycle.

The water droplets that remain in the liquid phase in the airflow lap the condenser 22, increasing the coefficient of heat exchange between the condenser 22 and airflow. In this way, the amount of heat absorbed by the condenser 22 is further increased, thereby causing a further increase in the efficiency of the vapour compression cycle.

Circuit 60 feeds the supply means 61 with water through the tank 70 on board the convertiplane 1 when the latter is in flight, or through tank 71, positioned on the ground, when the convertiplane 1 is on the ground. It is also possible to feed the supply means 61 through both tank 71 and tank 70 when the convertiplane 1 is on the ground.

Circuit 60 also feeds the supply means 61 with condensate water collected from the evaporator 24 of circuit 20. It is important to stress that feeding the supply means 61 with the condensate water collected from the evaporator 24 is in addition to and does not replace feeding with the water contained in tanks 70 and/or 71.

With particular reference to FIG. 3, the injectors 75 of the supply means 61 eject jets of water inside the airflow flowing in circuit 60.

Alternatively (FIG. 4), the sprayers 76 of the supply means 61 eject water spray on the membrane 78 through which the airflow flowing in the circuit 60 passes.

Alternatively (FIG. 4), the drippers 77 of the supply means 61 drip respective sequences of droplets by gravity onto the membrane 78 through which the airflow flowing in circuit 60 passes.

When the outside temperature is below the threshold value, for example because the convertiplane 1 is above a certain altitude threshold, the control unit 13 deactivates the supply means 61.

From an examination of the characteristics of the aircraft 1 and the cooling method of the aircraft 1 produced according to the present invention, the advantages that can be attained therewith are evident.

In particular, the convertiplane 1 comprises:
  a circuit 60, which can be fed with a flow of air and is thermally coupled to said condenser 22; and
  supply means 61 for supplying water inside said flow in a position upstream of the condenser 22 and spaced from the condenser 22, proceeding along the feed direction of the flow along circuit 60.

In this way, the water evaporates, removing an amount of heat substantially corresponding to the latent heat of vaporization and the airflow flowing in circuit 60 cools down. This lowering of temperature reduces the temperature and the condensation pressure of the condenser 22.

The increase in temperature difference between the coolant inside the condenser 22 and the airflow increases the heat released by the coolant inside the condenser 22 and, consequently, increases the efficiency of the vapour compression cycle in the case of system 10 (FIG. 2).

Due to the fact that water is supplied upstream of the condenser 22, inside the airflow and not directly on the condenser 22 as described in U.S. Pat. Nos. 5,149,147 and 6,643,751, it is possible to achieve the aforementioned increase in energy efficiency without increasing the weight and bulk of the condenser 22 installed on a vehicle such as the convertiplane 1.

In fact, for obvious reasons of weight and space saving, the heat exchange surface of the condenser 22 installed on the convertiplane 1 is normally much smaller than that of condensers used in the domestic air conditioners illustrated in U.S. Pat. Nos. 5,149,147 and 6,643,751. This smaller surface would reduce the amount of heat exchanged in the condenser 22 and must be compensated by a high airflow speed in circuit 60 in order to increase the coefficient of heat exchange between the airflow and the condenser 22.

According to the teachings of U.S. Pat. Nos. 5,149,147 and 6,643,751, this high speed would remove the water droplets deposited directly by the condenser, before they could evaporate.

In other words, the supply of water inside circuit 60 and upstream of the condenser 22 enables reducing the condensation temperature of the coolant in the condenser 22 and, therefore, increasing the energy efficiency of the cycle followed by said coolant, reducing the bulk and weight of the condenser 22.

This results in evident advantages in any moving vehicle application, and even more so for the convertiplane 1. In fact, for an aircraft, any reduction in weight is the equivalent to an increase in payload and/or drop in fuel consumption.

With particular reference to aircrafts and the convertiplane 1, this increase in efficiency also enables maintaining the desired temperature level in compartment, even when the outside temperature is particularly high, in the event of temperature peaks and in flight envelope extremes.

It is thus possible to ensure that the convertiplane 1 exceeds the certification requirements throughout the entire range of outside environment temperatures required by regulations.

The tank 70 arranged on board the convertiplane 1 enables feeding the supply means 61 with water when the convertiplane 1 is in flight. Contrariwise, tank 71 enables feeding the supply means 61 with water when the convertiplane 1 is on the ground and the outside temperature is particularly high. The condensate water collected from the evaporator 24 constitutes an additional feed source for the supply means 61.

The control unit 13 activates the supply means 61 when the temperature outside the convertiplane 1 is below the threshold value, for example, because the convertiplane 1 is above a certain altitude threshold.

Contrariwise, the control unit 13 deactivates the supply means 61 when the outside temperature is higher than the threshold value, for example, because the convertiplane 1 is below a certain altitude threshold.

In this way, it is possible to size the condenser 22 with a small surface, yet sufficient to ensure cooling of the air to be conveyed to the compartment 6 when the outside temperature is below the threshold value, and selectively activate the supply means 61 when the environmental temperature outside the convertiplane 1 is below the threshold value.

The water droplets that remain in the liquid phase in the airflow lap the condenser 22. This causes a further increase in coefficient of heat exchange between the condenser 22 and the airflow, a further increase in the amount of heat absorbed by the condenser 22 and a further increase in the efficiency of the vapour compression cycle.

In fact, the high speed of the air induces continuous regeneration of the fluid film on the surface of the condenser 22, preventing the film from reaching thermal equilibrium with said surface and causing a further increase in the amount of heat absorbed by the condenser 22.

The membrane 78, by being humidified, further improves the heat exchange between the airflow of circuit 60 and the condenser 22.

Lastly, the circuit 60 and the supply means 61 can be easily retrofitted on a convertiplane 1 without requiring a substantial redesign of the system 10.

Finally, it is clear that modifications and variants can be made with regard to the claimed aircraft 1 and the cooling method of the aircraft 1 without departing from the scope of the present invention.

The aircraft could also be an aeroplane or a gyrodyne.

The invention claimed is:

1. An aerial, marine or land vehicle (1), comprising:
   a compartment (6) to be cooled; and
   a first circuit (20) through which a coolant can pass;
   said first circuit (20), in turn, comprising:
     a heat exchanger (22), which can be fed with said coolant and is adapted to enable said coolant to release heat;
     a second circuit (60), which can be fed with a second flow of a heat-carrying fluid and is thermally coupled to said heat exchanger (22); and
     supply means (61) for supplying a mixture comprising water inside said second flow in a position upstream of said heat exchanger (22) and spaced from said heat exchanger (22), proceeding along the feed direction of said second flow along said second circuit (60), so as to cause evaporation of said mixture and cool said second flow in said heat exchanger (22);

said first circuit (20) being closed, and a coolant capable of changing phase passing through it;

said coolant performing, in use, a thermodynamic vapour compression cycle inside said first circuit (20);

said first circuit (20) comprising, in sequence:

compressor means (21), which can be fed with said coolant in the vapour phase (V) and can be activated to raise the pressure of said coolant in the vapour phase (V);

a condenser (22) defining said heat exchanger (22), arranged downstream of said compressor means (21), with reference to the feed direction of said coolant in said first circuit (20), and which can be fed with said coolant in the vapour phase (V) and is adapted to cause the transition of said coolant from the vapour phase (V) to the liquid phase (L);

thermal expansion means (23) arranged downstream of said condenser (22) with reference to said feed direction, which can be fed with said coolant in the liquid phase (L) and are adapted to cause the transition of said coolant to a two-phase condition (L+V) formed by a mixture of a liquid phase (L) and a vapour phase (V); and an evaporator (24) arranged downstream of said thermal expansion means (23) and upstream of said compressor means (21), with reference to said feed direction, and adapted to cause the transition of said coolant from said two-phase condition (L+V) to the vapour phase (V);

said vehicle (1) further comprising:

a third circuit (70) adapted to feed said mixture to said supply means (61); and a fourth circuit (50), which can be fluidically connected to said compartment (6);

said fourth circuit (50) comprising:

an inlet (51), which can be fluidically connected to said compartment (6) and which can be fed with a first flow of air to be cooled; and an outlet (52) which can be fluidically connected to said compartment (6) and through which the cooled said first flow of air can pass;

said evaporator (24) being interposed along said fourth circuit (50) between said inlet (51) and said outlet (52), and being thermally coupled to said fourth circuit (50) so as to cool said first flow of air;

wherein a first tank (71) of said mixture is fluidically connected to said third circuit (70); and said third circuit (70) is fluidically connected to a second tank (72) arranged outside said vehicle (1), and wherein the supply means (61) supplies a mixture comprising water inside said second flow in a position upstream of the condenser so as to continually regenerate a fluid film on a surface of the condenser (22).

2. The vehicle according to claim 1, characterized in that said supply means (61) comprise a plurality of injectors (75) fluidically connected to said third circuit (70) and facing into said second circuit (60) upstream of said heat exchanger (22), according to said feed direction.

3. The vehicle according to claim 1, characterized in that said supply means (61) comprise spraying means (76) or dripping means (77) of a sequence of droplets of said mixture.

4. The vehicle according to claim 3, characterized in that said second circuit (60) comprises a membrane (78) facing inside the second circuit (60) upstream of said heat exchanger (22), according to said feed direction;

said supply means (61) being configured to supply a sequence of water droplets on said membrane (78).

5. The vehicle according to claim 1, characterized in that said third circuit (70) is fluidically connected to said evaporator (24) and is fed with condensate water from the evaporator (24).

6. The vehicle according to claim 1, characterized in that it is an aircraft (1), and in that said supply means (61) can be selectively activated or deactivated, according to the temperature outside said aircraft (1);

said supply means (61) being selectively activated when said temperature is higher than a predetermined threshold value and selectively deactivated when said temperature is lower than a predetermined threshold value.

7. The vehicle according to claim 2, wherein the plurality of injectors are positioned adjacent the second circuit and are arranged linearly to cover an entire surface of the condenser with fluid.

8. A method of cooling a compartment (6) of an aerial, marine or land vehicle (1), comprising the steps of:

i) feeding a coolant along a first circuit (20);

said step i) comprising the step ii) of absorbing heat from said coolant in a heat exchanger (22);

iii) lapping said heat exchanger (22) with a second flow of a heat-carrying fluid;

iv) supplying, through supply means (61), a mixture containing water inside said second flow in a position upstream of said heat exchanger (22) and spaced from said heat exchanger (22), proceeding along the feed direction of said second flow, so as to continually regenerate a fluid film on a surface of the heat exchanger (22);

v) evaporating at least part of the fluid of said mixture during said step iv), so as to cool said second flow in said heat exchanger (22);

said first circuit (20) being closed and passed through by a coolant capable of changing phase passing through it;

said coolant performing a thermodynamic vapour compression cycle inside said first circuit (20);

said step i) comprising the steps of:

vi) fluidically connecting a second circuit (50) to said compartment (6);

vii) raising the pressure of said coolant in the vapour phase (V);

viii) condensing said coolant from said vapour phase (V) to a liquid phase (L), inside a condenser (22) defining said heat exchanger (22);

ix) thermally expanding said coolant in the liquid phase so as to cause the transition of said coolant to a two-phase condition (L+V) formed by a mixture of liquid (L) and vapour (V); and x) evaporating said coolant in an evaporator (24), so as to cause the transition of said two-phase condition (L+V) to the vapour phase (V);

said step vi) comprising the steps of:

xi) creating circulation of a first airflow to be cooled from said compartment (6) through said evaporator (24), so as to release heat to said coolant inside said evaporator (24) and cool the first airflow;

xii) feeding the cooled said first airflow from said evaporator (24) to said compartment (6), to cool the latter;

characterized in that said step iv) comprising the step xiii) of fluidically connecting a first tank (71) of said mixture arranged on board said vehicle (1) to a third circuit (70) that is adapted to feed said mixture to said supply means (61);

and characterized in that said step iv) comprises the step xiv) of fluidically connecting a second tank of said mixture arranged outside said vehicle (1) to said third circuit (70).

9. The method according to claim 8, characterized in that step iv) comprises the step xv) or spraying or dripping droplets of said mixture inside said second flow; and/or characterized in that said step iv) comprises the step xvi) of injecting a plurality of jets of said mixture inside said second flow.

10. The method according to claim 9, characterized in that step iv) comprises the step xvii) of collecting the condensate water of said evaporator (24) and making it available to said supply means (61).

11. The method according to claim 8, characterized in that it comprises the steps of:

xviii) selectively activating said supply means (61), when the temperature outside said vehicle (1) is higher than a predetermined threshold value; and xix) selectively deactivating said supply means (61), when the outside temperature outside said vehicle (1) is lower than a predetermined threshold value;

and/or characterized in that it comprises the further step xx) of lapping said heat exchanger (22) with unevaporated water droplets of said mixture entrained by said second flow.

* * * * *